US009501695B2

(12) United States Patent
Wang et al.

(10) Patent No.: US 9,501,695 B2
(45) Date of Patent: *Nov. 22, 2016

(54) EXTRACTING CARD DATA FROM MULTIPLE CARDS

(71) Applicant: GOOGLE INC., Mountain View, CA (US)

(72) Inventors: Xiaohang Wang, Millburn, NJ (US); Jeff Huber, Menlo Park, CA (US);
(Continued)

(73) Assignee: GOOGLE INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/837,605

(22) Filed: Aug. 27, 2015

(65) Prior Publication Data
US 2015/0371086 A1    Dec. 24, 2015

Related U.S. Application Data

(63) Continuation of application No. 13/931,966, filed on Jun. 30, 2013, now Pat. No. 9,152,858.

(51) Int. Cl.
G06K 9/00 (2006.01)
G06K 9/32 (2006.01)

(52) U.S. Cl.
CPC ....... *G06K 9/00463* (2013.01); *G06K 9/00469* (2013.01); *G06K 9/3283* (2013.01); *G06K 2209/01* (2013.01)

(58) Field of Classification Search
CPC ............ G06K 9/00463; G06K 9/00469; G06K 9/4604; G06K 9/4638; G06T 7/004;
(Continued)

(56) References Cited

U.S. PATENT DOCUMENTS 9,152,858 B2 * 10/2015 Wang et al. ....... G06K 9/00463
382/182
2007/0031059 A1 2/2007 Achong et al. ............... 382/274
(Continued)

OTHER PUBLICATIONS

U.S. Appl. No. 14/462,711 to Wang et al. filed Aug. 19, 2014.
(Continued)

*Primary Examiner* — Andrew W Johns
(74) *Attorney, Agent, or Firm* — Johnson, Marcou & Isaacs, LLC

(57) ABSTRACT

Extracting financial card information with relaxed alignment comprises a method to receive an image of a card, determine one or more edge finder zones in locations of the image, and identify lines in the one or more edge finder zones. The method further identifies one or more quadrilaterals formed by intersections of extrapolations of the identified lines, determines an aspect ratio of the one or more quadrilateral, and compares the determined aspect ratios of the quadrilateral to an expected aspect ratio. The method then identifies a quadrilateral that matches the expected aspect ratio and performs an optical character recognition algorithm on the rectified model. A similar method is performed on multiple cards in an image. The results of the analysis of each of the cards are compared to improve accuracy of the data.

30 Claims, 10 Drawing Sheets

(72) Inventors: Farhan Shamsi, Rego Park, NY (US);
Yakov Okshtein, Far Rockaway, NY (US); Sanjiv Kumar, White Plains, NY (US); Henry Allan Rowley, Sunnyvale, CA (US); Marcus Quintana Mitchell, New York, NY (US); Debra Lin Repenning, Riverside, CT (US)

(58) Field of Classification Search
CPC ............. G06T 7/0042; G06T 7/0079; G06T 7/0083; G06T 2207/20136; G06T 2207/20164; G06T 2207/30176; G06Q 20/34; G06Q 20/346; G06Q 20/352; G06Q 20/3567
See application file for complete search history.

(56) References Cited

U.S. PATENT DOCUMENTS

| | | | |
|---|---|---|---|
| 2008/0170784 A1* | 7/2008 | Guerzhoy et al. | 382/173 |
| 2010/0158402 A1 | 6/2010 | Nagase et al. | 382/255 |
| 2011/0285873 A1 | 11/2011 | Showering | 348/231.99 |
| 2012/0099780 A1* | 4/2012 | Smith et al. | 382/136 |
| 2012/0143760 A1 | 6/2012 | Abulafia et al. | 705/44 |
| 2012/0284185 A1 | 11/2012 | Mettler et al. | 705/44 |
| 2013/0004076 A1 | 1/2013 | Koo et al. | 382/176 |
| 2013/0120595 A1 | 5/2013 | Roach et al. | H04N 5/225 |
| 2013/0195347 A1 | 8/2013 | Okada et al. | G06T 15/00 |
| 2013/0335575 A1* | 12/2013 | Tsin et al. | 348/169 |

OTHER PUBLICATIONS

Datta, "Credit Card Processing Using Cell Phone Images", Department of Electrical Engineering, Stanford University Jan. 1, 2011, 1-7.

Jacob, "Identification Numbers and Check Digit Algorithms", www.codeproject.com/Articles/459507/Identification-numbers-and-check-digit-algorithms, Sep. 20, 2012, 1-11.

Jagannathan, et al., "Perspective Correction Methods for Camera-Based Document Analysis", Proc. First Int. Workshop on Camera-Based Document Analysis and Recognition, 2005, 1-7.

Nilsson, "International Search Report and Written Opinion issued in International Application PCT/US2014/044968", Nov. 7, 2014, 1-14.

Patel, "OA mailed Mar. 19, 2015", Oct. 23, 2015, 1-11.

Patel, "Office Action issued in copending U.S. Appl. No. 14/104,901, filed Dec. 12, 2013", Feb. 11, 2014, 1-17.

Patel, "Office Action issued in copending U.S. Appl. No. 14/462,711, filed Aug. 19, 2014", Mar. 19, 2015, 1-11.

Patel, "Office Action issued in copending U.S. Appl. No. 14/462,711, filed Aug. 19, 2014", Jul. 1, 2015, 1-12.

Patel, "Office Action issued in copending U.S. Appl. No. 14/462,711, filed Aug. 19, 2014", Nov. 5, 2014, 1-6.

Unknown, "TVCG Submission—Video Snapshots: Creating High-Quality Images from Video Clips", web: http://www.eecs.harvard.edu/~kalyans/research/snapshots/supplementary/results.html, May 18, 2013, 1-17.

Unknown, "Understanding Optical Character Recognition (OCR)", www.adcnordic.com/news/ocr.php, Jan. 1, 2002, 1-7.

* cited by examiner

215

405
OCR application identifies intersections of the detected lines

410
OCR application identifies quadrilaterals from detected lines

415
OCR application renders the image in three dimensional space

420
OCR application performs a perspective transform to rectify card

425
OCR application determines the quadrilateral that meets expected card shape

Block 220, Figure 2

Fig. 4

EXTRACTING CARD DATA FROM MULTIPLE CARDS

CROSS-REFERENCE TO RELATED APPLICATIONS

This patent application is a continuation of U.S. patent application Ser. No. 13/931,966 filed Jun. 30, 2013 and entitled "Extracting Card Data From Multiple Cards." The entire contents of the above-identified priority application are hereby fully incorporated herein by reference.

TECHNICAL FIELD

The technology disclosed herein pertains to extracting financial card information, and more particularly to allowing a user computing device to extract financial card information from one card with relaxed alignment or from multiple cards.

BACKGROUND

When a consumer makes an online purchase or a purchase using a mobile user computing device, the consumer is often forced to enter credit card information into the user computing device for payment. Due to the small screen size and keyboard interface on a mobile device, such entry is generally cumbersome and prone to errors. Users may utilize many different cards for purchases, such as credit cards, debit cards, stored value cards, and other cards. Information entry difficulties are multiplied for a merchant attempting to process mobile payments on mobile devices for multiple transactions.

Current applications for obtaining payment information from a payment card require a precise positioning of the card in the scan. Typically, a box is presented on the user interface of the user computing device. The user is required to precisely line the card up with the box to allow the user computing device to recognize the card.

Users additionally may desire to enter information into a user computing device from loyalty cards, identification cards, access cards, and other suitable cards.

SUMMARY

The technology of the present disclosure includes computer-implemented methods, computer program products, and systems for extracting financial card information with relaxed alignment. Predicting the effectiveness of a candidate offer comprises a method to receive an image of a card; determine one or more edge finder zones in locations of the image; identify lines in the one or more edge finder zones; identify one or more quadrilaterals formed by intersections of extrapolations of the identified lines; determine an aspect ratio of the one or more quadrilaterals; compare the determined aspect ratios of the quadrilaterals to an expected aspect ratio; identify a quadrilateral that matches the expected aspect ratio; model a region of the image encompassed by the identified quadrilateral in three dimensions; rectify the three dimensional model; and perform an optical character recognition algorithm on the rectified model. A similar method is performed on multiple cards in an image. The results of the analysis of the each of the cards are compared to improve accuracy of the data.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 4 is a block flow diagram depicting methods for performing geometric verification, in accordance with certain example embodiments.

DETAILED DESCRIPTION OF THE EXAMPLE EMBODIMENTS

Overview

Figure 1:
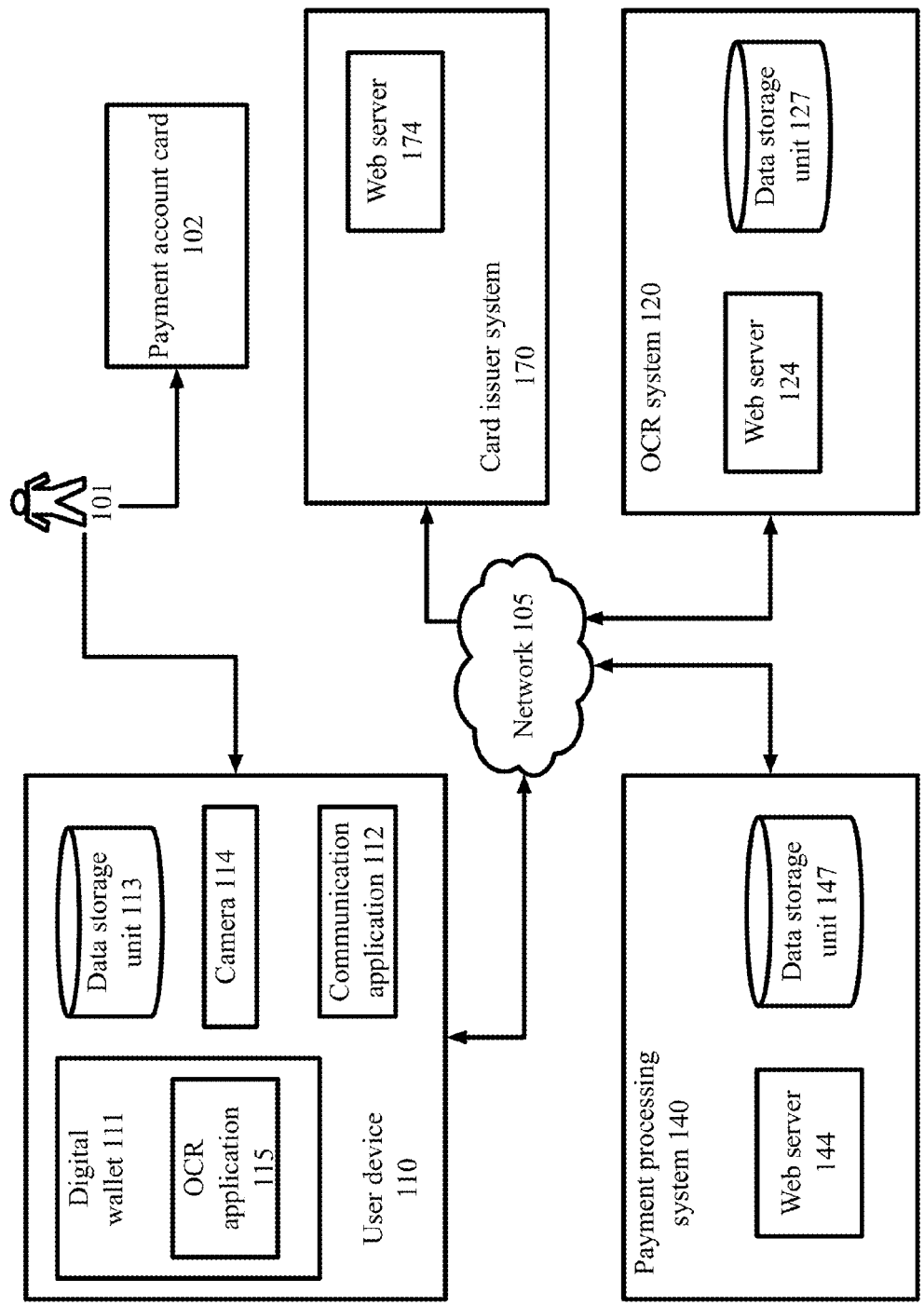
FIG. 1 is a block diagram depicting a system for extracting financial account information with relaxed card alignment and for extracting financial account information from multiple cards, in accordance with certain example embodiments of the technology disclosed herein.

Embodiments herein provide computer-implemented techniques for allowing a user device to extract financial card information with relaxed alignment. Extracting financial card information with relaxed alignment includes using an optical character recognition ("OCR") application detecting each of four individual card edges. The four card edges are located in four relaxed edge finder zones. The OCR application identifies strong edge candidate lines in the four zones and forms quadrilaterals with the lines. The quadrilateral dimensions are verified against expected card dimensions and identifies the most likely card edges. The OCR application performs a perspective transform of the image to adjust the image of the card to a "fronto-parallel" orientation. The OCR process can be limited to areas of the financial card where the financial information is expected to be located.

Throughout the specification, the general term "card" will be used to represent any type of physical card instrument, such as a magnetic stripe card. In example embodiments, the different types of card represented by "card" can include credit cards, debit cards, stored value cards, loyalty cards, identification cards, or any other suitable card representing an account of a user or other information thereon.

The user may employ the card when making a transaction, such as a purchase, ticketed entry, loyalty check-in, or other suitable transaction. The user may obtain the card information for the purpose of importing the account represented by the card into a digital wallet application module of a computing device or for other digital account purposes. The card is typically a plastic card containing the account information and other data on the card. In many card embodiments, the customer name, expiration date, and card numbers are physically embossed on the card. The embossed information is visible from both the front and back of the card, although the embossed information is typically reversed on the back of the card.

A user may desire to enter the information from the card into a user computing device or other computing device, for example, to conduct an online purchase, to conduct a purchase with a mobile computing device or other computing device, to add the information to a wallet application on a computing device, or for any other suitable reason. In an example, the user desires to use a mobile computing device to conduct a purchase transaction using a digital wallet application module executing on the mobile computing device. The digital wallet application module may require an input of the details of a particular user payment account to conduct a transaction with the particular user payment account or to set up the account. Due to the small screen size and keyboard interface on a mobile device, such entry can be cumbersome and error prone for manual input. Additionally, a merchant system may need to capture card information to conduct a transaction or for other reasons.

In addition to account identifiers, the front of the card typically contains logos of the issuer of the card, pictures chosen by the user or the issuer, other text describing the type or status of the user account, a security code, and other marketing and security elements, such as holograms or badges. The user name, card expiration date, and the account identifier, such as a credit card number, may be embossed on the front of the card such that the information protrudes from the front of the card.

The user employs a mobile phone, digital camera, or other user computing device to capture an image of the card associated with the account that the user desires to input into the user computing device.

An OCR application on the user computing device receives the image of the card. The image may be obtained from the camera module of a user computing device, such as the camera on a mobile phone. The image may be obtained from a scanner coupled to the user computing device or any other suitable digital imaging device. The image may be obtained from video captured by the user computing device. The image may be accessed by the OCR application on the user computing device from a storage location on the user computing device, from a remote storage location, or from any suitable location. All sources capable of providing the image will be referred to herein as a "camera."

The functions of the OCR application may be performed by any suitable module, hardware, software, or application operating on the user computing device. Some, or all, of the functions of the OCR application may be performed by a remote server or other computing device.

The image is presented on the user interface of the user computing device as a live video image of the financial card.

The OCR application can isolate and store one or more images from the video feed of the camera. For example, the user may hover the camera function of a user computing device over a financial card and observe the representation of the financial card on the user interface of the user computing device.

The OCR application performs blur detection on the image. The OCR application, the camera module, or the user computing device may recognize that the image is blurry, overly bright, overly dark, or otherwise obscured in a manner that prevents a high resolution image from being obtained. The OCR application, or other function of the user computing device or the camera, may adjust the image capturing method to reduce the blur in the image. For example, the OCR application may direct the camera to adjust the focus on the financial card. In another example, the OCR application may direct the user to move the camera closer to, or farther away from, the financial card. In another example, the OCR application may perform a digital image manipulation to remove the blur. Any other suitable method of correcting a blurred image can be utilized.

The OCR application may optionally convert the image to grayscale. Financial cards often contain pictures, logos, designs, icons, names, holograms, and other art on the face of the card. Converting the image to grayscale by the OCR application may, in some circumstances, make edge locations more discernable. The conversion to grayscale, or other suitable image manipulations, may occur at any other time of the OCR process. For example, the grayscale conversion can occur after the edge detection.

The OCR application identifies edges in each edge finder zone. The OCR application finds one or more lines in each edge finder zone that are distinct from the average noise level in the zones. The OCR application can locate the edges of the card, but may also locate lines that are printed on the card, lines on the surface on which the card is lying, or other lines in the image. In certain circumstances, the edge of the card is not the most prominent line in the image. Thus, the OCR application captures multiple lines to ensure that the edge of the card is identified along with the other lines.

The OCR application identifies the lines or edges in the edge finder zone using a suitable line detection software or hardware. The line detection may be performed on the user computing device by the OCR application or another suitable module. In an alternate embodiment, the edge detection may be performed by a remote computing device such as an OCR system server. If lines are not detected, then the image may be rejected. If multiple lines are detected, the OCR application may identify the strongest edge candidates from the detected lines or a group of strong edge candidates.

Card edge candidate lines are combined into a series of intersections. A line, or an extrapolation of the lines, may cross other lines or the extrapolations of other lines. The crossing of the lines forms an intersection. The OCR application may identify the intersection points of all of the lines in the image.

Card edge intersections are combined into a series of quadrilaterals. For example, the OCR application identifies two or four intersections that together form a quadrilateral. The OCR application may identify more than one quadrilateral formed by the candidate intersections. Some candidate edge lines and intersections may be used in multiple quadrilaterals.

The OCR application can also render the image of the card in three dimensional ("3D") space to rectify the shapes of the quadrilateral. The OCR application may manipulate the image to produce a 3D model of the quadrilaterals and the card in the image to allow the image to be realigned to different perspectives. The 3D model may be created by a digital manipulation of the image by the OCR application or another computing device.

The OCR application rectifies the card in the image by bringing the card in the image to a fronto-parallel perspective. The OCR application adjusts the perspective of the image until the most likely quadrilateral is fronto-parallel to the camera.

The OCR application identifies the quadrilateral that most closely replicates the expected shape of the card in the image. If the card in the image is a credit card, the OCR application accesses information associated with the expected aspect ratio of a credit card. The expected shape may be obtained from a database of card shapes stored on the user computing device or in another suitable location. For example, credit cards, driver's licenses, loyalty cards, and other cards typically meet an industry standard for the aspect ratio of the card. The industry standards may be stored in the OCR application or in a location accessible by the OCR application.

The OCR application may compare the candidate quadrilaterals with the expected aspect ratio of the card. The OCR application may compare the candidate quadrilaterals at different perspectives produced by the 3D rendering of the image. That is, the OCR application may compare different perspectives of each quadrilateral until a particular quadrilateral at a particular perspective produces an aspect ratio that matches the expected aspect ratio.

The OCR application may configure a threshold variance from the expected aspect ratio required for a quadrilateral to be identified as the best rendering of the card. In another example, the OCR application selects the particular quadrilateral at a particular perspective that produces the closest match to the expected aspect ratio of the card. If none of the quadrilaterals match the expected aspect ratio of the card, the image may be rejected.

The OCR application isolates the image of the card. The OCR application may use the edges that form the identified quadrilateral as the edges of the card and crop the picture to display and process only the card.

The OCR application may crop out the image to display only the desired information from the card. For example, if the card in the image is a credit card, the OCR application accesses information associated with the expected location of the account number of a credit card. The expected location may be obtained from a database of card layouts stored on the user computing device or in another suitable location. For example, credit cards, driver's licenses, loyalty cards, and other cards typically meet an industry standard for the data locations and the layout of the card. The industry standards may be stored in the OCR application or in a location accessible by the OCR application.

The OCR application employs an OCR algorithm or other computer implemented process to determine the card information. For example, the OCR application may use an OCR program to analyze the image of the card or the cropped image to extract the financial account number of a credit card. The extracted number may be presented to the user for verification, stored in the OCR application, transmitted to a remote computer, stored in a digital wallet application module, or used in any suitable manner. Other information, such as the user name, expiration date, security code, or any suitable information, can also be extracted from the image.

In another example, the user scans the image of multiple cards at the same time. For example, the user may arrange multiple cards on a flat surface, such as on a table. The user can hover the camera over the cards and capture an image of all of the cards in the image. In another example, the user can scan the camera over the cards until an image of each of the cards has been captured.

The OCR application detects the edges of the cards. The OCR application identifies lines or edges from the image in a similar manner described previously. For example, the OCR application may identify many lines in a single image corresponding to the plurality of cards. Intersections of the lines are identified. Lines and intersections from each of the plurality of cards in a single image will form multiple quadrilaterals in a plurality of locations within the frame of the image.

The OCR application determines the edges forming quadrilaterals and renders the image in 3D as described herein. The OCR application performs the 3D modeling on the image comprising all of the quadrilaterals or the OCR application isolates images of each quadrilateral into separate images. That is, the OCR application can isolate each proposed quadrilateral and copy each proposed quadrilateral into separate images.

The OCR application performs a perspective transform as described herein to identify the quadrilaterals that match the expected aspect ratios for the cards. The quadrilaterals that meet the expected aspect ratios may be isolated into separate images for analysis. In alternate examples, the card images are maintained on a single image.

In another example, the images of the cards are captured in a scan of the cards. The OCR application may capture a video or a series of images from multiple angles and frames. The OCR application may analyze the multiple images and capture the lines and quadrilaterals as described herein. The OCR application may model the images in 3D and produce images of likely cards as described herein.

The OCR application isolates an image of each card based on the described methods. The OCR application optionally crops the card data areas as described herein. The OCR application identifies the financial account information as described herein.

The OCR application compares the extracted financial account information from each card to determine differences and commonalities. For example, the OCR application may compare the user name associated with each card to search for extraction errors. In this example, the OCR application may determine that the names of the user extracted from the images are the same in 3 of the 4 instances. The OCR application may determine that the different extracted user name is likely to have an error. The OCR application may analyze the differing image again, request user input, or revise the extracted name.

Example System Architectures

Turning now to the drawings, in which like numerals represent like (but not necessarily identical) elements throughout the figures, example embodiments are described in detail.

FIG. 1 is a block diagram depicting a system for extracting financial account information with relaxed card alignment and for extracting financial account information from multiple cards, in accordance with certain example embodiments. As depicted in FIG. 1, the system 100 includes network computing devices 110, 120, 140, and 170 that are configured to communicate with one another via one or more networks 105. In some embodiments, a user associated with a device must install an application and/or make a feature selection to obtain the benefits of the techniques described herein.

Each network 105 includes a wired or wireless telecommunication means by which network devices (including devices 110, 120, 140, and 170) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network computing device 110, 120, 140, and 170 includes a device having a communication module capable of transmitting and receiving data over the network 105. For example, each network device 110, 120, 140, and 170 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 120, 140, and 170 are operated by end-users or consumers, OCR system operators, payment processing system operators, and card issuer operators, respectively. In certain embodiments, the various operators may have to download an application, activate a feature of an application, and/or otherwise enable an application to take advantage of the features described herein.

The user 101 can use the communication application 112, which may be, for example, a web browser application or a stand-alone application, to view, download, upload, or otherwise access documents or web pages via a distributed network 105. The network 105 includes a wired or wireless telecommunication system or device by which network devices (including devices 110, 120, 140, and 170) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages.

The user computing device 110 may employ a communication module 112 to communicate with the web server 124 of the OCR system 120 or other servers. The communication module 112 may allow devices to communicate via technologies other than the network 105. Examples might include a cellular network, radio network, or other communication network.

The user computing device 110 may include a digital wallet application module 111. The digital wallet application module 111 may encompass any application, hardware, software, or process the user device 110 may employ to assist the user 101 in completing a purchase. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112.

The user device 110 may include an optical character recognition ("OCR") application 115. The OCR application 115 can interact with the communication application 112 or be embodied as a companion application of the communication application 112 and execute within the communication application 112. In an exemplary embodiment, the OCR application 115 may additionally or alternatively be embodied as a companion application of the digital wallet application module 111 and execute within the digital wallet application module 111. The OCR application 115 may employ a software interface that may open in the digital wallet application 111 or may open in the communication application 112. The interface can allow the user 101 to configure the OCR application 115 and the user account on the offer provider system 150.

The OCR application 115 can be used to analyze a card and extract information or other data from the card. The OCR system 120 or other system that develops the OCR algorithms or other methods may include a set of computer-readable program instructions, for example, using JavaScript, that enable the OCR system 120 to interact with the OCR application 115.

Any of the functions described in the specification as being performed by the OCR application 115 can be performed by the payment processing system 140, the OCR system 120, the user computing device 110, a merchant system (not pictured) or any other suitable hardware or software system or application.

The user device 110 includes a data storage unit 113 accessible by the OCR application 115 and the communication application 112. The exemplary data storage unit 113 can include one or more tangible computer-readable media. The data storage unit 113 can be stored on the user device 110 or can be logically coupled to the user device 110. For example, the data storage unit 113 can include on-board flash memory and/or one or more removable memory cards or removable flash memory.

The user device 110 may include a camera 114. The camera may be any module or function of the user computing device 110 that obtains a digital image. The camera 114 may be onboard the user computing device 110 or in any manner logically connected to the user computing device 110. The camera 114 may be capable of obtaining individual images or a video scan. Any other suitable image capturing device may be represented by the camera 114.

The payment processing computing system 140 includes a data storage unit 147 accessible by the web server 144. The example data storage unit 147 can include one or more tangible computer-readable storage devices. The payment processing system 140 is operable to conduct payments between a user 101 and a merchant system (not pictured). The payment processing system 140 is further operable to manage a payment account of a user 101, maintain a database to store transactions of the merchant system and the user 101, verify transactions, and other suitable functions.

The user 101 may use a web server 144 on the payment processing system 140 to view, register, download, upload, or otherwise access the payment processing system 140 via a website (not illustrated) and a communication network 105). The user 101 associates one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101.

A card issuer, such as a bank or other institution, may be the issuer of the financial account being registered. For example, the card issuer may be a credit card issuer, a debit card issuer, a stored value issuer, a financial institution providing an account, or any other provider of a financial account. The payment processing system 140 also may function as the issuer for the associated financial account. The user's 101 registration information is saved in the payment processing system's 140 data storage unit 147 and is accessible the by web server 144. The card issuer employs a card issuer computing system 170 to issue the cards, manage the user account, and perform any other suitable functions. The card issuer system 170 may alternatively issue cards used for identification, access, verification, ticketing, or cards for any suitable purpose. The card issuer utilizes a web server 174 for developing or storing the card 102 programs, maintaining the user account, providing the card 102 to the user 101, or any other suitable functions.

The OCR computing system 120 utilizes an OCR system web server 124 operating a system that produces, manages, stores, or maintains OCR algorithms, methods, processes, or services. The OCR system web server 124 may represent the computer implemented system that the OCR system 120 employs to provide OCR services to user computing devices 110, merchants, or any suitable part. The OCR system web server 124 can communicate with one or more payment processing systems 140, a user device 110, or other computing devices via any available technologies. These technologies may include, but would not be limited to, an Internet connection via the network 105, email, text, instant messaging, or other suitable communication technologies. The OCR system 120 may include a data storage unit 127 accessible by the web server 124 of the OCR system 120. The data storage unit 127 can include one or more tangible computer-readable storage devices.

Any of the functions described in the specification as being performed by the OCR system 120 can be performed by the OCR application 115, the user computing device 110, or any other suitable hardware or software system or application.

The user 101 may employ the card 102 when making a transaction, such as a purchase, ticketed entry, loyalty check-in, or other suitable transaction. The user 101 may obtain the card information for the purpose of importing the account represented by the card 102 into a digital wallet application module 111 of a computing device 110 or for other digital account purposes. The card 102 is typically a plastic card containing the account information and other data on the card 102. In many card 102 embodiments, the customer name, expiration date, and card numbers are physically embossed on the card 102. The embossed information is visible from both the front and back of the card 102, although the embossed information is typically reversed on the back of the card 102.

It will be appreciated that the network connections shown are exemplary and other means of establishing a communications link between the computers and devices can be used. Moreover, those having ordinary skill in the art having the benefit of the present disclosure will appreciate that the user device 110, OCR system 120, payment processing system 140, and card issuer system 170 illustrated in FIG. 1 can have any of several other suitable computer system configurations. For example, a user device 110 embodied as a mobile phone or handheld computer may not include all the components described above.

Example Processes

The example methods illustrated in FIG. 2-5 are described hereinafter with respect to the components of the example operating environment 100. The example methods of FIG. 2-5 may also be performed with other systems and in other environments.

Figure 2:
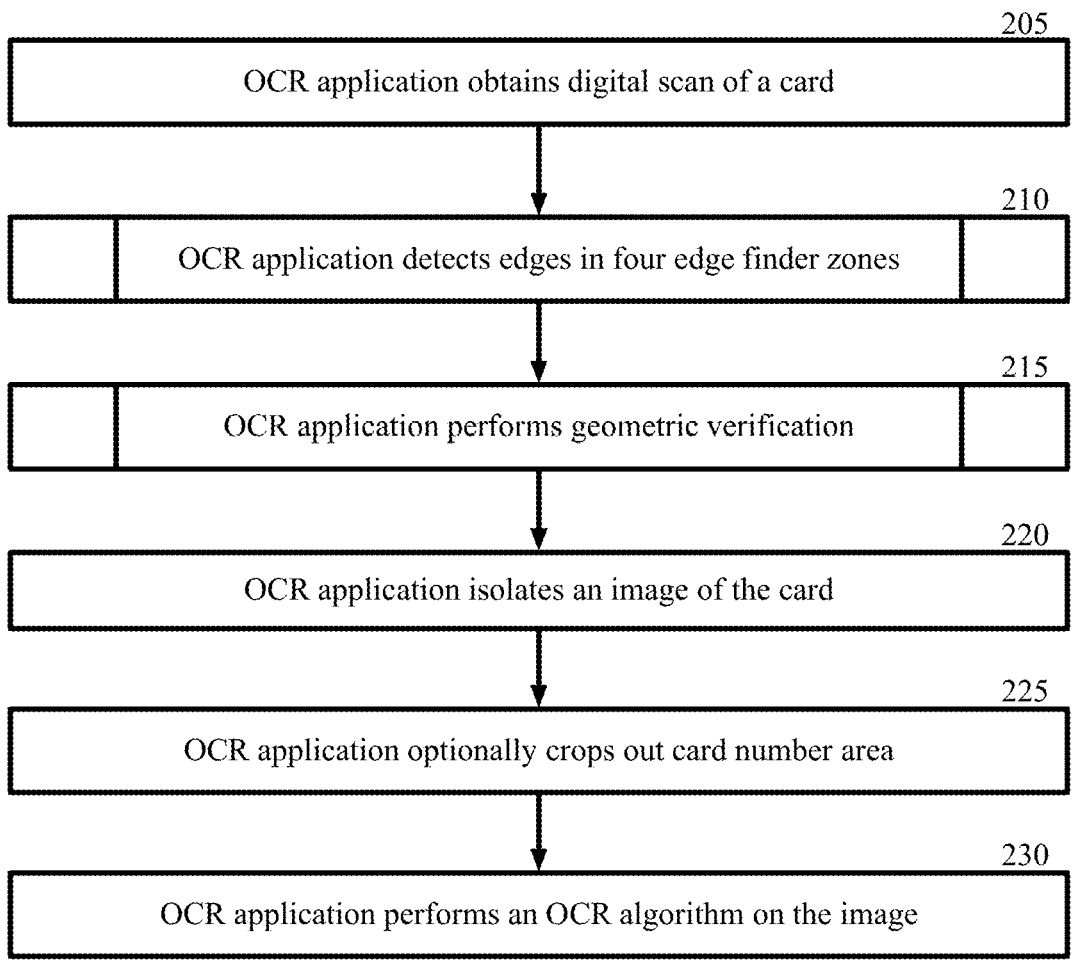
FIG. 2 is a block flow diagram depicting methods for extracting financial account information with relaxed card alignment, in accordance with certain example embodiments.

FIG. 2 is a block flow diagram depicting a method 200 for extracting financial account information with relaxed card 102 alignment, in accordance with certain exemplary embodiments.

With reference to FIGS. 1 and 2, in block 205, the optical character recognition ("OCR") application 115 on the user device 110 obtains a digital scan of a card 102. The user 101 employs a mobile phone, digital camera, or other user computing device 110 to capture an image of the card 102 associated with the account that the user 101 desires to input into the user computing device 110.

The OCR application 115 on the user computing device 110 receives the image of the card 102. The image may be obtained from the camera module of the user computing device 110, such as the camera 114 on a mobile phone. The image may be obtained from a scanner coupled to the user computing device 110 or any other suitable digital imaging device. The image may be obtained from video captured by the user computing device 110. The image may be accessed by the OCR application 115 on the user computing device 110 from a storage location on the user computing device 110, from a remote storage location, or from any suitable location. All sources capable of providing the image will be referred to herein as a "camera" 114.

The functions of the OCR application 115 may be performed by any suitable module, hardware, software, or application operating on the user computing device 110. Some, or all, of the functions of the OCR application 115 may be performed by a remote server or other computing device.

The image is presented on the user interface of the user computing device 110 as a live video image of the card. The OCR application 115 can isolate and store one or more images from the video feed of the camera 114. For example, the user 101 may hover the camera 114 function of a user computing device 110 over the card 102 and observe the representation of the card on the user interface of the user computing device 110.

In block 210, the OCR application 115 detects edges of the card 102 in four edge finder zones. The edge finder zones are illustrated in FIGS. 6 and 7.

Figure 6:
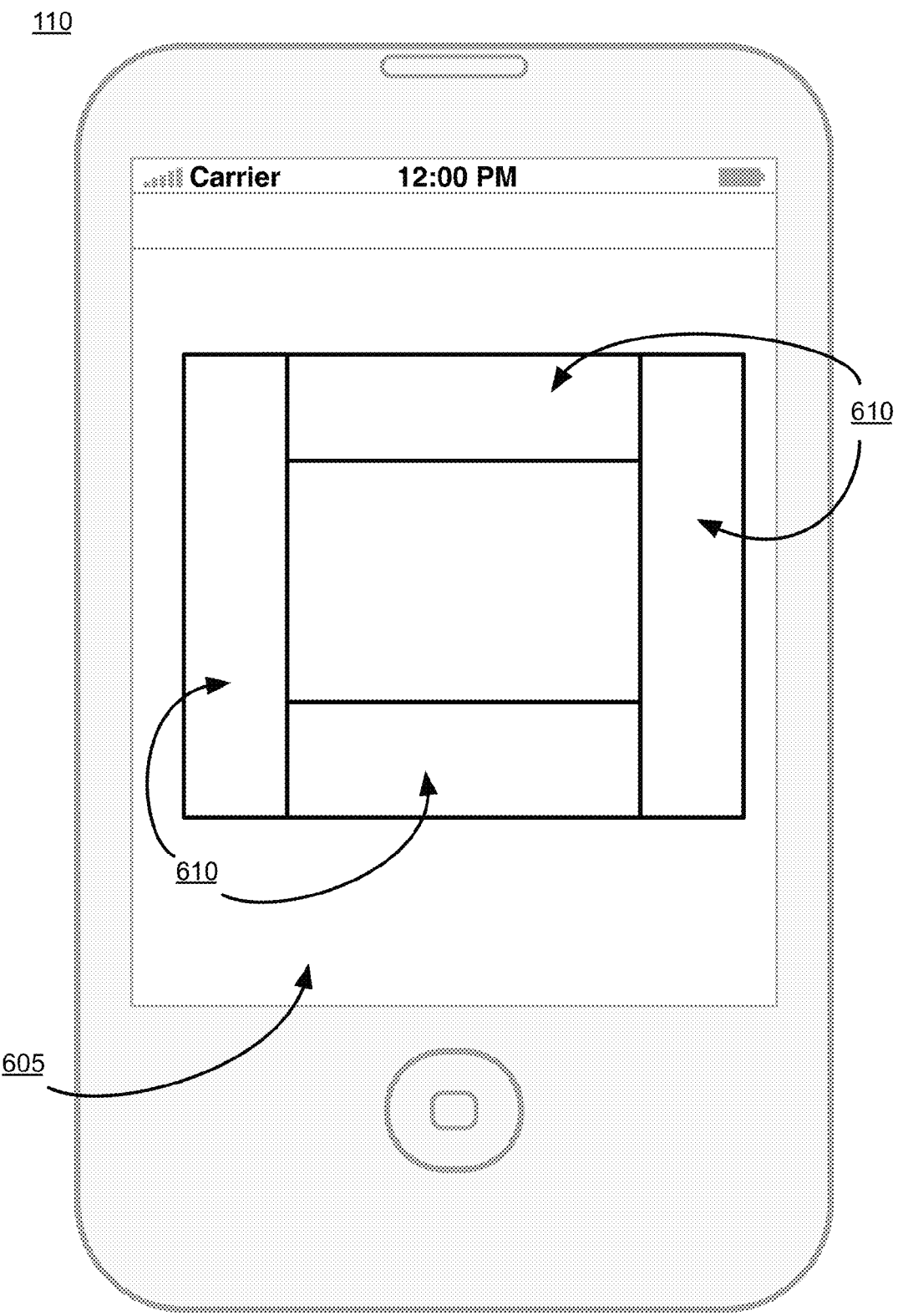
FIG. 6 is an illustration of a user computing device displaying four edge finder zones, in accordance with certain example embodiments.

FIG. 6 depicts an illustration of a user computing device 110 displaying four edge finder zones 610, in accordance with certain example embodiments. The user computing device 110 in FIG. 6 is a mobile smartphone. The user computing device 110 comprises a user interface screen 605. In the illustration, a user 101 has opened the OCR application 115 and is preparing to display an image of a card 102 on the screen 605. The four edge finder zones 610 are shown on the screen 605 in the illustration. The edge finder zones 610 may not be visible to the user 101 on the screen 605. In the example, the edge finder zones 610 are quadrilateral zones that are positioned in an arrangement dictated by the aspect ratio a standard credit card. If the card 102 was of a different shape, the shape of the edge finder zones 610 may be altered accordingly.

The edge finder zones 610 are located in regions of the screen 605 that are likely to contain an edge of the card. In the example, the edge finder zones 610 are shown as being located in regions bordering the edge of the screen. The edge finder zones 610 are of a size that is likely to encompass the edge of the card 102 based on the size of the screen and other system constraints. The size and location of the edge finder zones 610 may be based on instructions provided to the user 101 for positioning the card 102 in the image. In an example, the OCR application 115 instructs the user 101 to position the camera 114 in a manner such that the card 102 nearly fills the screen. The user interface may provide a display to provide the user 101 with an example of how to position the card 102 before the camera. Any suitable criteria may be used to dictate the size and location of the edge finder zones 610.

Figure 7:
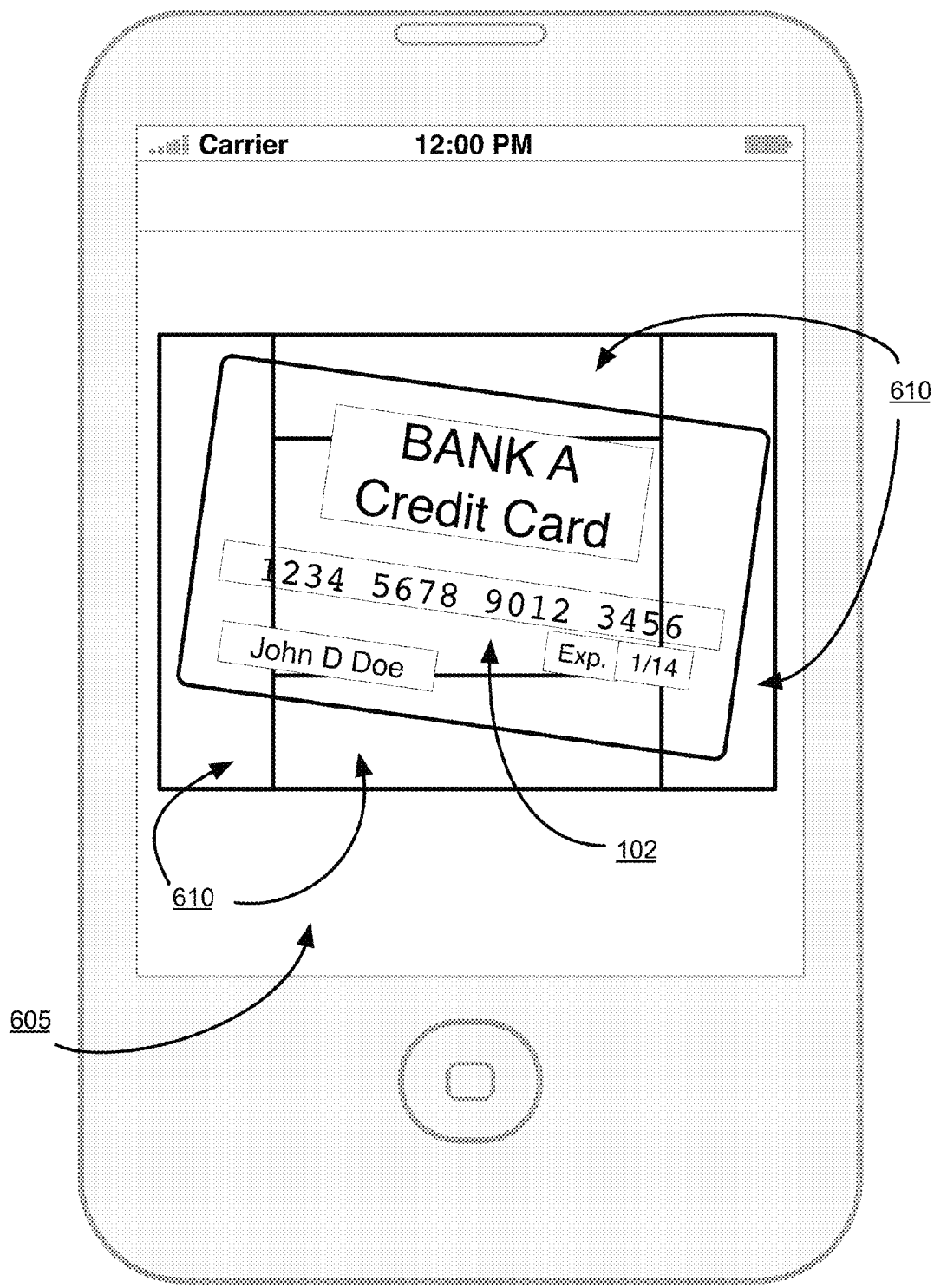
FIG. 7 is an illustration of user computing device displaying four edge finder zones and a displayed image of a financial card, in accordance with certain example embodiments.

FIG. 7 is an illustration of user computing device displaying four edge finder zones 610 and a displayed image of a financial card 102, in accordance with certain example embodiments. The user computing device 110 displays an image of a card 102 with the edge finder zones 610 superimposed on the image. The card 102 is aligned in a position other than fronto-parallel to the camera 114, but the edges of the card 102 are each predominately in an edge finder zone 610. The user 101 may place the card 102 on a flat surface, such as a table, and hover the camera 114 over the card 102. The card 102 is displayed on the screen 605 of the user computing device 110. The user 101 may be requested to ensure that the edges are located in the edge finder zones 610. The edge finder zones 610 are sized and located so that the user 101 is not required to precisely position the card 102. As long as the user 101 positions the card 102 in the loose edge finder zones 610, the OCR application 115 is able to proceed with the data extraction. In an example, the edge finder zones 610 are not displayed on the screen 605. The user 101 may be requested to position the card 102 on the display in any suitable manner as described herein.

Figure 3:
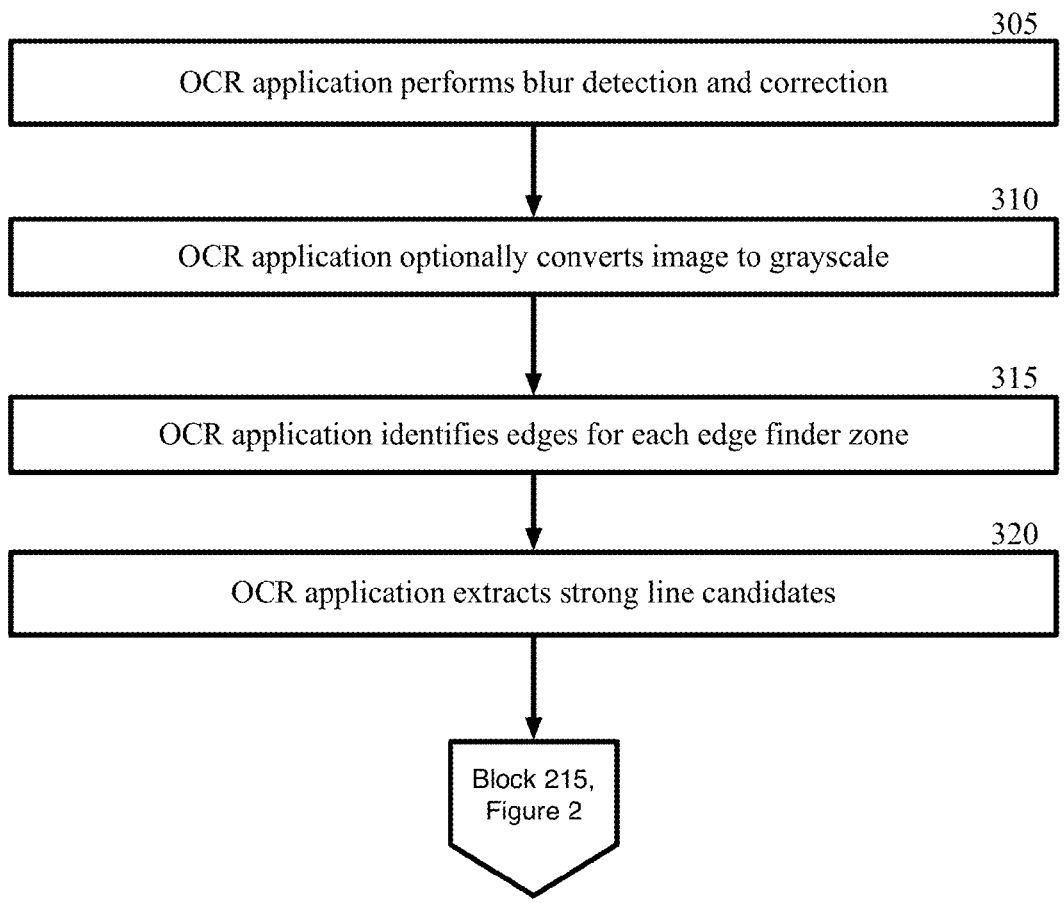
FIG. 3 is a block flow diagram depicting methods for detecting edges in four edge finder zones, in accordance with certain example embodiments.

The details of the method of block 210 are described in greater detail in method 210 of FIG. 3.

FIG. 3 is a block flow diagram depicting methods for detecting card edges in four edge finder zones displayed on a user interface of a computing device, in accordance with certain example embodiments.

In block 305, the OCR application 115 performs blur detection on the image. The OCR application 115, the camera 114 module, or the user computing device 110 may recognize that the image is blurry, overly bright, overly dark, or otherwise obscured in a manner that prevents a high resolution image from being obtained. The OCR application 115, or other function of the user computing device 110 or the camera 114, may adjust the image capturing method to reduce the blur in the image. For example, the OCR application 115 may direct the camera 114 to adjust the focus on the financial card. In another example, the OCR application 115 may direct the user 101 to move the camera 114 closer to, or farther away from, the financial card. In another example, the OCR application 115 may perform a digital image manipulation to remove the blur. Any other suitable method of correcting a blurred image can be utilized.

In block 310, the OCR application 115 may optionally convert the image to grayscale. Financial cards often contain pictures, logos, designs, icons, names, holograms, and other art on the face of the card 102. Converting the image to grayscale by the OCR application 115 may, in some circumstances, make edge locations more discernable. The conversion to grayscale, or other suitable image manipulations, may occur at any other time of the OCR process. For example, the grayscale conversion may occur after the edge detection.

In block 315, the OCR application 115 identifies edges in each edge finder zone. The OCR application 115 finds one or more lines in each edge finder zone that are distinct from the average noise level in the zones. The OCR application 115 can locate the edges of the card 102, but may also locate lines that are printed on the card 102, lines on the surface on which the card 102 is lying, or other lines in the image. In certain circumstances, the edge of the card 102 is not the most prominent line in the image. Thus, the OCR application 115 captures multiple lines to ensure that the edge of the card 102 is identified along with the other lines.

The edge detection process is a set of mathematical methods which aim at identifying points in a digital image at which the image brightness changes sharply or has discontinuities. The points at which brightness of the image changes are typically organized into a set of edges. A typical edge might be the border between the card 102 and the surface under the card. In contrast a line can be a small number of pixels of a different color on an otherwise unchanging background, such as a section of card art on the card 102. For a line, there may be one edge on each side of the line. Once the OCR application 115 computes a measure of edge strength (typically the gradient magnitude), a threshold is applied to decide whether edges are present. The lower the threshold, the more edges will be detected, and the result will be increasingly susceptible to noise and detecting edges of irrelevant features in the image. Conversely a high threshold may miss subtle edges, or result in fragmented edges.

The OCR application 115 identifies the lines or edges in the edge finder zone using any suitable line detection software or hardware. The line detection may be performed on the user computing device 110 by the OCR application 115 or another suitable module. In an alternate embodiment, the edge detection may be performed by a remote computing device such as an OCR system server 124 to which the image has been communicated. If appropriate lines are not detected, then the image may be rejected.

Figure 8:
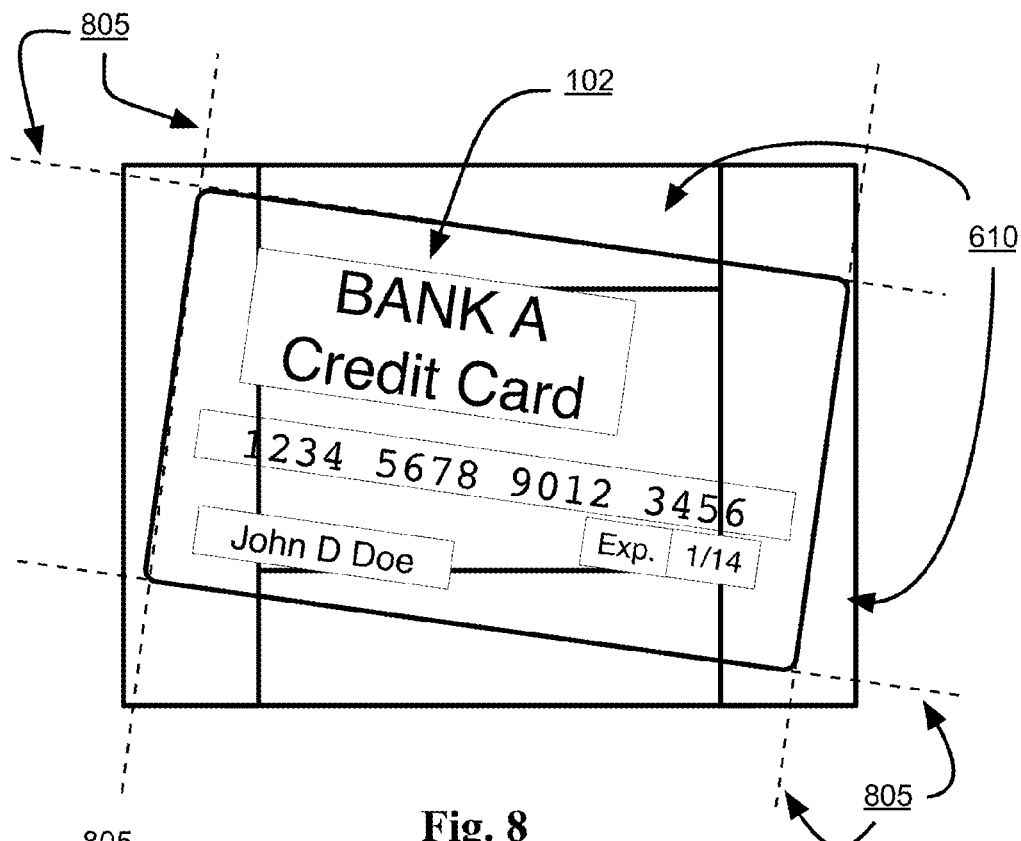
FIG. 8 is an illustration of lines representing identified edges of a financial card, in accordance with certain example embodiments.

FIG. 8 is an illustration of lines representing identified edges of a card 102, in accordance with certain example embodiments. The card 102 is shown with the edges identified as lines 805. The lines 805 are shown as extrapolated. The lines 805 may be extended via extrapolation to the boundaries of the screen 605 or any suitable boundary. The card 102 is shown with relaxed positioning. That is, the card 102 is not positioned in a fronto-parallel position to the camera 114. The edge finder zones 610 find the edges 805 in each zone despite the relaxed positioning.

Returning to FIG. 3, in block 320, the OCR application 115 extracts strong line candidates. If multiple lines are detected, the OCR application 115 may identify the strongest edge candidates from the detected lines or a group of strong edge candidates. The strongest line candidates may be the lines that are most distinct from the background noise, or may be identified by any suitable criteria. From block 320, the method 310 returns to block 215 in FIG. 2.

Returning to FIG. 2, in block 215, the OCR application 115 performs a geometric verification to isolate the card in the image. The details of block 215 are described in greater detail in the method 215 in FIG. 4.

FIG. 4 is a block flow diagram depicting methods for performing geometric verification, in accordance with certain example embodiments.

In block 405, card edge candidate lines are combined into a series of intersections. A line, or an extrapolation of the lines, may cross other lines or the extrapolations of other lines. The crossing of the lines forms an intersection. The OCR application 115 may identify the intersection points of all of the lines in the image.

In block 410, card edge intersections are combined into a series of quadrilaterals. For example, the OCR application 115 identifies two or four intersections that together may be extrapolated to form a quadrilateral. The OCR application 115 may identify more than one quadrilateral formed by the candidate intersections. Some candidate edge lines and intersections may be used in multiple quadrilaterals. Example intersections and quadrilaterals are illustrated in FIG. 9.

Figure 9:
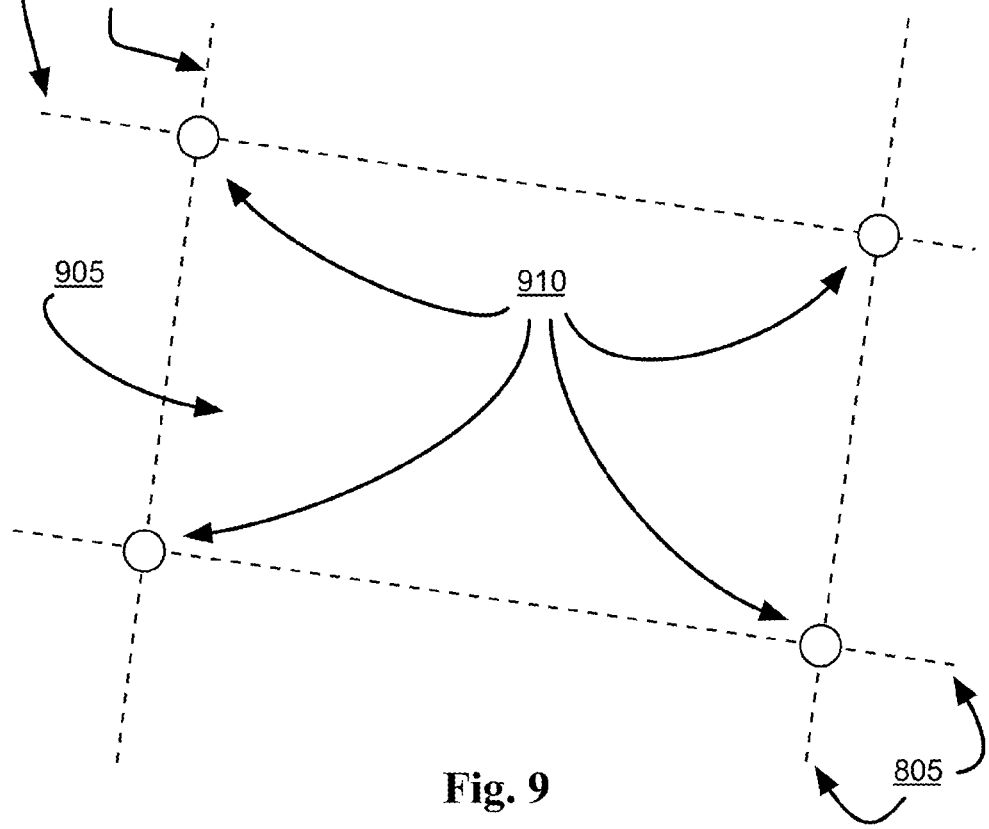
FIG. 9 is an illustration of a quadrilateral formed by lines representing identified edges of a financial card, in accordance with certain example embodiments.

FIG. 9 is an illustration a quadrilateral 905 formed by lines 805 representing identified edges of a card 102, in accordance with certain example embodiments. The lines 805 are identified by the OCR application 115 as described in FIG. 3. The intersections 910 are identified by the OCR application 115 as described in block 405. The quadrilateral 905 is identified by the OCR application 115 as described in block 410. For example, after identifying strong edge candidates 805, the OCR application identifies intersections 910 of the lines 805. The positions of the intersections 910 are analyzed, and a quadrilateral 905 may be modeled with the intersections 910 as the corners of the quadrilateral 905.

Returning to FIG. 4, in block 415, the OCR application 115 can also render the image of the card 102 in three dimensional ("3D") space to rectify the shapes of the quadrilateral. The OCR application 115 may manipulate the image to produce a 3D model of the quadrilaterals and the card in the image to allow the image to be realigned to different perspectives. The 3D model may be created by a digital manipulation of the image by the OCR application 115 or another computing device.

The 3D model is the created by developing a mathematical representation of any three-dimensional surface of object. The product is called a 3D model. The 3D model may be displayed as a two-dimensional image through a process called 3D rendering.

When creating a 3D model, the OCR application 115 is unable to determine which point on a line corresponds to the image point from a single image. If two images are available, then the position of a 3D point can be found as the intersection of the two projection rays. The process is referred to as triangulation. If the OCR application 115 obtains multiple images from the camera 114, a detailed 3D model may be created from triangulating the many points on the images. The triangulation of the points allows the OCR application 115 to determine the depth of each point in the two-dimensional images. Once the multiple depth maps are created, the OCR application 115 combines the maps to create a final mesh by calculating depth and projecting out of the camera 114.

The 3D model may be rotated, zoomed, or in any manner manipulated to allow the OCR application 115 to view perspectives of the card 102 that are unavailable to a viewer of a two-dimensional image.

In block 420, the OCR application 115 rectifies the card in the image by bringing the card in the image to a fronto-parallel perspective. The OCR application 115 adjusts the perspective of the image until the most likely quadrilateral is fronto-parallel to the camera 114.

For example, the OCR application 115 identifies the quadrilateral that most closely replicates the expected shape of the card 102 in the image. If the card 102 in the image is a credit card, the OCR application 115 accesses information associated with the expected aspect ratio of a credit card. The expected shape may be obtained from a database of card shapes stored on the user computing device 110 or in another suitable location. For example, credit cards, driver's licenses, loyalty cards, and other cards typically meet an industry standard for the aspect ratio of the card. The industry standards may be stored in the OCR application 115 or in a location accessible by the OCR application 115.

In block 425, the OCR application 115 identifies the quadrilateral that meets the expected card shape. The OCR application 115 may compare the candidate quadrilaterals with the expected aspect ratio of the card. The OCR application 115 may compare the candidate quadrilaterals at different perspectives produced by the 3D rendering of the image. That is, the OCR application 115 may compare different perspectives of each quadrilateral until a particular quadrilateral at a particular perspective produces an aspect ratio that matches the expected aspect ratio. If the OCR application 115 identifies more than one quadrilateral that meets the expected card shape, then the processing described herein may be performed for each such quadrilateral.

The OCR application 115 may configure a threshold variance from the expected aspect ratio required for a quadrilateral to be identified as the best rendering of the card. In another example, the OCR application 115 selects the particular quadrilateral at a particular perspective that produces the closest match to the expected aspect ratio of the card. If none of the quadrilaterals match the expected aspect ratio of the card, the image may be rejected.

From block 425, the method 215 returns to block 220 of FIG. 2.

Returning to FIG. 2, in block 220, the OCR application 115 isolates the image of the card 102. The OCR application 115 may use the edges that form the identified quadrilateral as the edges of the card 102 and crop the picture to display and process only the card.

In block 225, the OCR application 115 may crop the image to display only the desired information from the card 102. For example, if the card 102 in the image is a credit card, the OCR application 115 accesses information associated with the expected location of the account number of a credit card. The expected location may be obtained from a database of card layouts stored on the user computing device 110 or in another suitable location. Credit cards, driver's licenses, loyalty cards, and other cards typically meet an industry standard or a particular issuer standard for the data locations and the layout of the card. The standards may be stored in the OCR application 115 or in a location accessible by the OCR application 115. In certain circumstances, the data locations may be provided by the issuer of the card 102.

In block 230, the OCR application 115 performs an OCR algorithm or other computer implemented process to determine the card information. For example, the OCR application 115 may use an OCR algorithm to analyze the image of the card or the cropped image to extract the financial account number of a credit card. The extracted number may be presented to the user 101 for verification, stored in the OCR application 115, transmitted to a remote computer, stored in a digital wallet application module 111, or used in any suitable manner. Other information, such as the user name, expiration date, security code, or any suitable information, may also be extracted from the image.

Figure 5:
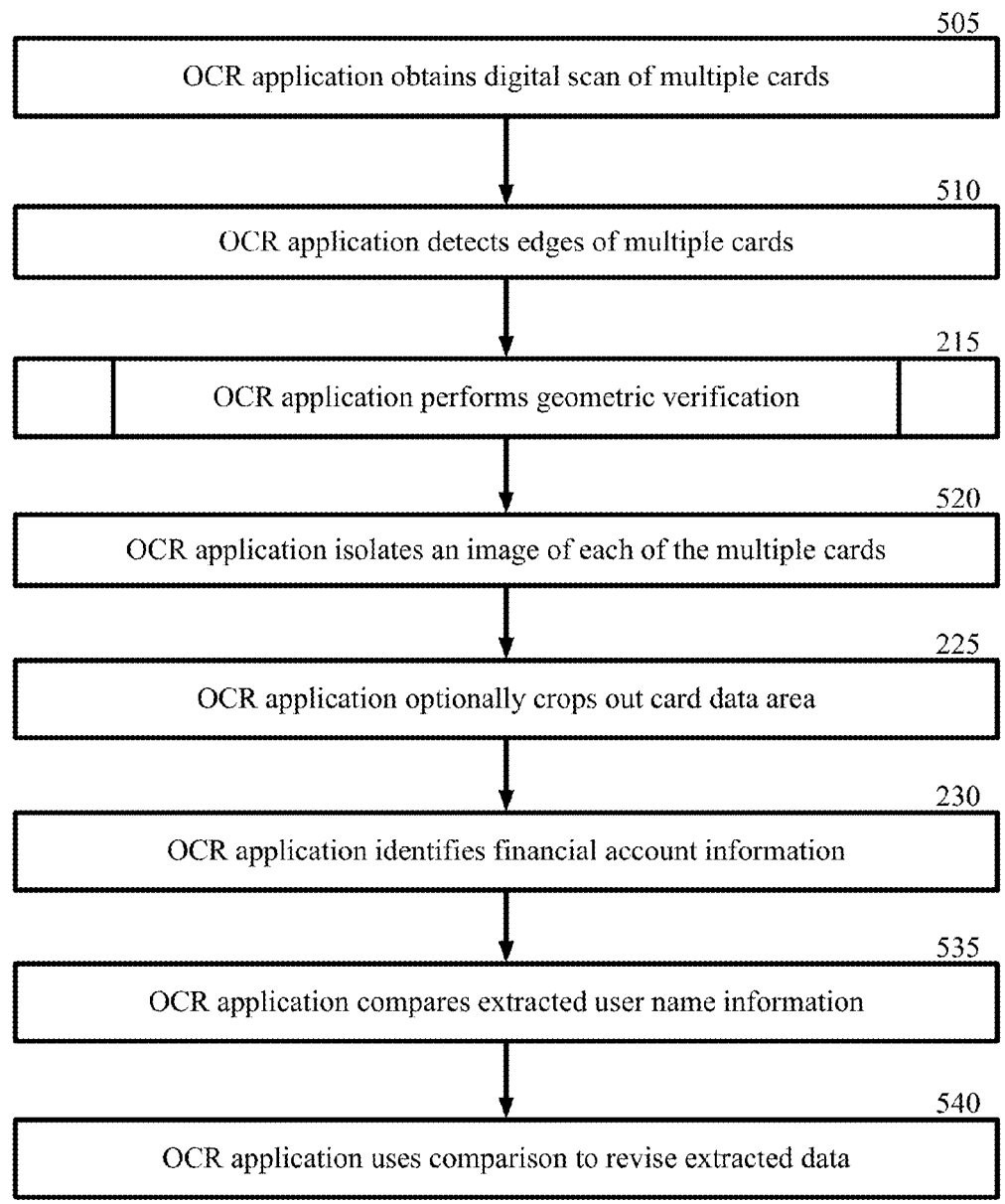
FIG. 5 is block flow diagram depicting methods for extracting financial account information from multiple cards, in accordance with certain example embodiments.

FIG. 5 is block flow diagram depicting methods for extracting financial account information from multiple cards, in accordance with certain example embodiments.

In block 505 of FIG. 5, the user 101 scans the image of multiple cards 102 at the same time. For example, the user 101 may arrange multiple cards 102 on a flat surface, such as on a table. The user 101 can hover the camera 114 over the cards 102 and capture an image of all of the cards 102 in the image. In another example, the user 101 can scan the camera 114 over the cards 102 until an image of each of the cards 102 has been captured.

Figure 10:
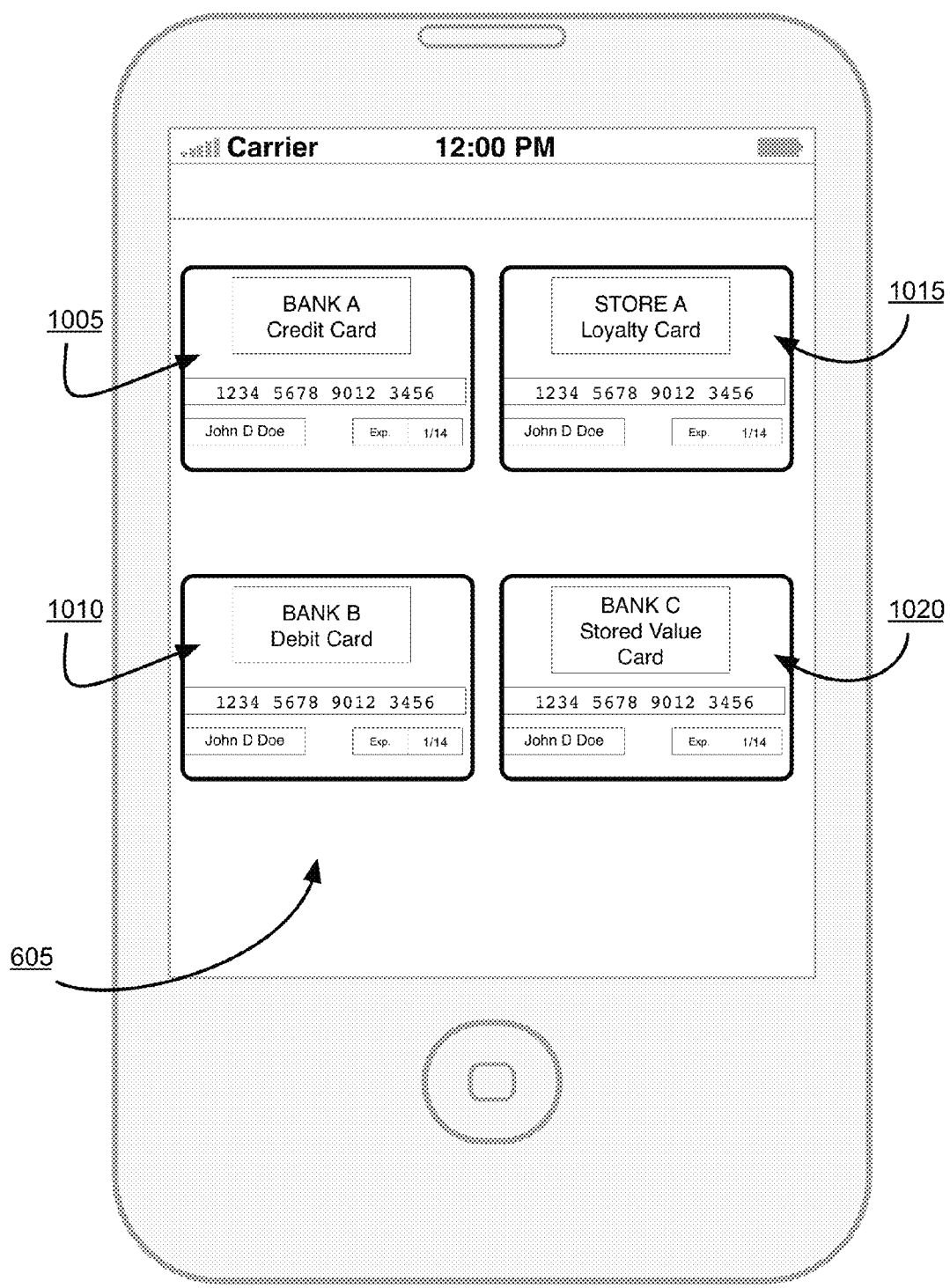
FIG. 10 is an illustration of a user computing device displaying multiple cards, in accordance with certain example embodiments.

FIG. 10 is an illustration of a user computing device 110 displaying multiple cards 102, in accordance with certain example embodiments. In the illustration, the screen 605 of the user computing device 110 displays an image of four cards 102. For example, the four cards 102 were placed on a flat surface and the camera 114 was used to obtain an image encompassing all four cards 102. The cards 102 in the illustration included four different types of cards 102. Card 1005 illustrates a credit card issued by Bank A. Card 1010 illustrates a credit card issued by Bank B. Card 1015 illustrates a loyalty card issued by Store A. Card 1020 illustrates a stored value card issued by Bank C.

Returning to FIG. 5, in block 510, the OCR application 115 detects the edges of the multiple cards 102. The OCR application 115 may identify lines or edges from the image in a similar manner described previously in method 210 of FIG. 3, including edges in an edge zone 610 (see FIG. 6) and edges that are not in an edge zone. In block 510, the OCR application may apply the method of block 210 described previously with reference to FIGS. 2 and 3, or a similar method, to multiple cards. For example, many lines in a single image corresponding to the plurality of cards 102 are identified. After identifying the lines, intersections of the lines are located. Lines and intersections from each of the plurality of cards 102 in a single image will form multiple quadrilaterals in a plurality of locations within the frame of the image.

In block 215, the OCR application 115 identifies quadrilaterals, renders the image in 3D, performs a perspective transform to rectify the cards 102, and determines the quadrilaterals that meet expected card shapes, as described in greater detail in method 215 described previously with reference to FIG. 4. The OCR application 115 performs the 3D modeling on the image comprising all of the quadrilaterals or the OCR application 115 isolates images of each quadrilateral into separate images. That is, the OCR application 115 may isolate each proposed quadrilateral and copy each proposed quadrilateral into separate images. The quadrilaterals that meet the expected aspect ratios may be isolated into separate images for analysis. In alternate examples, the card images are maintained on a single image.

In another example, the images of the cards 102 are captured in a scan of the cards 102. The OCR application 115 may capture a video or a series of images from multiple angles and frames. The OCR application 115 may analyze the multiple images and capture the lines, intersections, and quadrilaterals as described herein. The OCR application 115 may model the images in 3D and produce images of likely cards as described herein.

In block 520, the OCR application 115 isolates an image of each card 102. Multiple quadrilaterals may be identified from the edges and intersections as likely cards 102. The multiple identified quadrilaterals may be determined as being the likely border of multiple cards 102 based on the analysis of the aspect ratios, the 3D models, and any suitable analysis. The OCR application 115 may use the edges and intersections that form the identified quadrilaterals as the borders of the card 102 and crop the picture to display and process multiple cards.

In block 225, the OCR application 115 may crop the image to display only the desired information from each of the cards 102, as described in greater detail in block 225 in FIG. 2.

In block 230, the OCR application 115 identifies the financial account information as described in block 230 of FIG. 2.

In block 535, the OCR application 115 compares the extracted financial account information from each card 102 to determine differences and commonalities. For example, the OCR application 115 may compare the user 101 name associated with each card 102 to search for extraction errors. In this example, the OCR application 115 may determine that the names of the user 101 extracted from the images are the same in 3 of the 4 instances.

In block 540, the OCR application 115 determines that the different extracted user name is likely to have an error or that the names match across all the cards. The OCR application 115 may analyze the differing image again to determine if the results are consistent. Additionally or alternatively, the OCR application 115 requests user 101 input to determine if the user information is correct. For example, if two of the cards produce differing information, the OCR application 115 may present an option to the user 101 to correct one or both of the cards 102. In some circumstances, the differing user information may both be correct even though the user information may be different. For example, one card may have John Smith as the use name while another card has J. A. Smith as the user name. In certain embodiments, the OCR application 115 may only compare a portion of the user information, such as the last name of the user 101, to allow for differing formats. In certain embodiments, the OCR application 115 may revise the extracted user information that differs from the user information on other cards 102.

Other Example Embodiments

Figure 11:
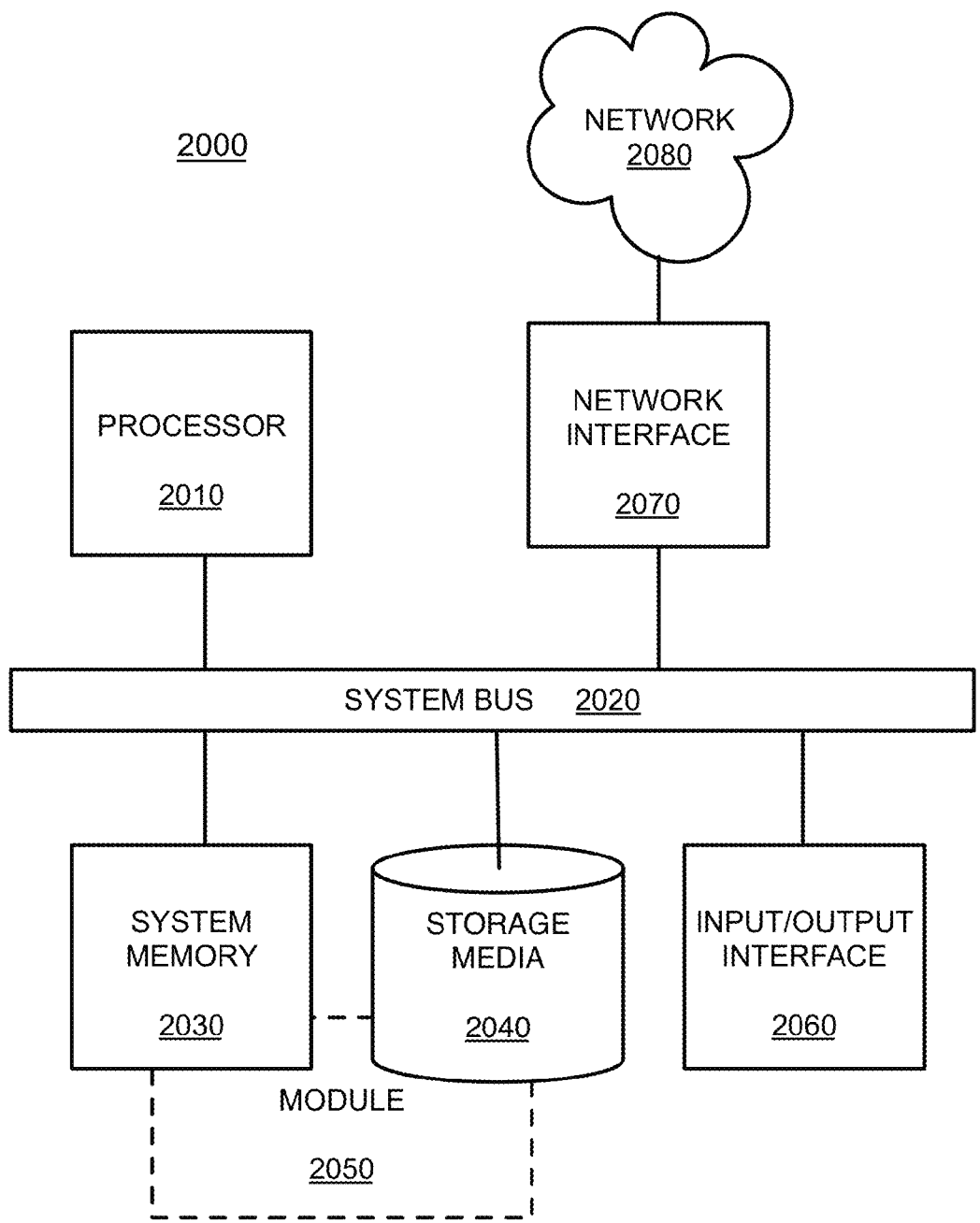
FIG. 11 is a block diagram depicting a computing machine and a module, in accordance with certain example embodiments.

FIG. 11 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to extract financial card information from multiple cards, comprising:
   identifying, by one or more computing devices, one or more quadrilaterals formed by a plurality of intersections of lines from an image of a plurality of cards;
   determining, by the one or more computing devices, a corresponding aspect ratio for each of the quadrilaterals;
   comparing, by the one or more computing devices, the determined aspect ratios for each of the quadrilaterals to an expected aspect ratio, the expected aspect ratio being based at least in part on a type of card represented in the image;
   identifying, by the one or more computing devices, one or more particular quadrilaterals that match the expected aspect ratio; and
   performing, by the one or more computing devices, an optical character recognition algorithm on each of the particular quadrilaterals to extract financial card information from each quadrilateral.

2. The method of claim 1, further comprising:
   cropping, by the one or more computing devices, the image into a plurality of images corresponding to the plurality of quadrilaterals identified as preferred card boundaries; and
   performing, by the one or more computing devices, the optical character recognition algorithm on each cropped image to extract financial card information from each cropped image.

3. The method of claim 1, further comprising:
   modeling, by the one or more computing devices, one or more regions of the image encompassed by the one or more particular quadrilaterals in three dimensions;
   rectifying, by the one or more computing devices, the three dimensional models to produce one or more rectified images of the particular quadrilaterals,
   wherein the optical character recognition algorithm is performed on the rectified models of the card.

4. The method of claim 1, further comprising:
   determining, by the one or more computing devices, a location on each of the identified quadrilaterals comprising account information, the location being based at least in part on a type of cards represented in each of the quadrilaterals; and
   applying, by the one or more computing devices, the optical character recognition algorithm to only the determined location of each identified quadrilateral.

5. The method of claim 1, wherein the image of the one or more identified quadrilaterals is not cropped, and the optical character recognition algorithm is performed on each of the identified quadrilaterals.

6. The method of claim 1, further comprising:
extracting, by the one or more computing devices, a user name from each of the identified quadrilaterals;
comparing, by the one or more computing devices, the user names extracted from each of the identified quadrilaterals; and
assessing, by the one or more computing devices, the accuracy of the extracted names based at least in part on the comparison.

7. The method of claim 1, further comprising converting, by the one or more computing devices, one or more of the card images to grayscale.

8. The method of claim 1, further comprising:
storing, by the one or more computing devices, the aspect ratios of one or more card types in a database; and
identifying, by the one or more computing devices, the expected aspect ratio of the card types in the cropped images based the database.

9. The method of claim 1, further comprising:
detecting, by the one or more computing devices, blur in the image; and
performing, by the one or more computing devices, a configured action to remove the blur from the image.

10. The method of claim 1, wherein the card comprises a credit card, a debit card, an identification card, a loyalty card, or an access card.

11. A computer program product, comprising:
a non-transitory computer-readable storage device having computer-executable program instructions embodied thereon that when executed by a computer cause the computer to extract financial card information from multiple cards, the computer-executable program instructions comprising:
computer-executable program instructions to identify one or more quadrilaterals formed by a plurality of intersections of lines from an image of a plurality of cards;
computer-executable program instructions to determine a corresponding aspect ratio for each of the quadrilaterals;
computer-executable program instructions to compare the determined aspect ratios of each of the quadrilaterals to an expected aspect ratio, the expected aspect ratio being based at least in part on a type of card represented in the image;
computer-executable program instructions to identify one or more particular quadrilaterals that match the expected aspect ratio;
computer-executable program instructions to crop the image into a plurality of images corresponding to the plurality of quadrilaterals identified as preferred card boundaries; and
computer-executable program instructions to perform an optical character recognition algorithm on each cropped image to extract financial card information from each cropped image.

12. The computer program product of claim 11, the computer-executable program instructions further comprising:
computer program instructions to modeling one or more regions of the image encompassed by the one or more identified quadrilaterals in three dimensions; and
computer program instructions to rectify the three dimensional model to produce a rectified image of the particular quadrilaterals,
wherein the optical character recognition algorithm is performed on the rectified model of the card.

13. The computer program product of claim 11, the computer-executable program instructions further comprising:
computer program instructions to determine a location on each of the particular quadrilaterals comprising account information, the location being based at least in part on a type of cards represented in each of the quadrilaterals; and
computer program instructions to perform the optical character recognition algorithm on only the determined location of each identified quadrilateral.

14. The computer program product of claim 11, further comprising computer program instructions to convert the image to grayscale.

15. The computer program product of claim 11, the computer-executable program instructions further comprising:
computer program instructions to extract a user name from each of the identified quadrilaterals;
computer program instructions to compare a user name from each of the identified quadrilaterals; and
computer program instructions to assess the accuracy of the extracted names based at least in part on the comparison.

16. The computer program product of claim 11, the computer-executable program instructions further comprising:
computer program instructions to blur in the image; and
computer program instructions to perform a configured action to remove the blur from the image.

17. The computer program product of claim 11, wherein the card comprises a credit card, a debit card, an identification card, a loyalty card, or an access card.

18. The computer program product of claim 11, the computer-executable program instructions further comprising:
cropping the image into a plurality of images corresponding to the plurality of quadrilaterals identified as preferred card boundaries; and
performing the optical character recognition algorithm on each cropped image to extract financial card information from each cropped image.

19. The computer program product of claim 11, the computer-executable program instructions further comprising:
storing the aspect ratios of one or more card types in a database; and
identifying the expected aspect ratio of the card types in the cropped images based the database.

20. The computer program product of claim 11, wherein the image of the one or more identified quadrilaterals is not cropped, and the optical character recognition algorithm is performed on each of the identified quadrilaterals.

21. A system to extract financial card information from multiple cards, comprising:
a storage resource;
a processor communicatively coupled to the storage resource, wherein the processor executes application code instructions that are stored in the storage device to cause the system to:
identify one or more quadrilaterals formed by a plurality of lines from an image of a plurality of cards;
determine a corresponding aspect ratio for each of the quadrilaterals;
compare the determined aspect ratios of each of the quadrilaterals to an expected aspect ratio, the expected aspect ratio being based at least in part on a type of card represented in the image;

identify one or more particular quadrilaterals that match the expected aspect ratio;

model a region of the image encompassed by each of the particular quadrilaterals in three dimensions;

rectify the three dimensional models of each of the identified quadrilaterals to produce rectified images; and perform an optical character recognition algorithm on the rectified models of each of the quadrilaterals of the particular quadrilaterals.

22. The system of claim 21, the processor executing further application code instructions that are stored in the storage device and that cause the system to:

detect blur in the image; and perform a configured action to remove the blur from the image.

23. The system of claim 21, wherein the card comprises a credit card, a debit card, an identification card, a loyalty card, or an access card.

24. The system of claim 21, the processor executing further application code instructions that are stored in the storage device and that cause the system to:

crop the image into a plurality of images corresponding to the plurality of quadrilaterals identified as preferred card boundaries; and perform the optical character recognition algorithm on each cropped image to extract financial card information from each cropped image.

25. The system of claim 21, the processor executing further application code instructions that are stored in the storage device and that cause the system to:

model one or more regions of the image encompassed by the one or more particular quadrilaterals in three dimensions;

rectify the three dimensional models to produce one or more rectified images of the particular quadrilaterals, wherein the optical character recognition algorithm is performed on the rectified models of the card.

26. The system of claim 21, the processor executing further application code instructions that are stored in the storage device and that cause the system to:

determine a location on each of the identified quadrilaterals comprising account information, the location being based at least in part on a type of cards represented in each of the quadrilaterals; and apply the optical character recognition algorithm to only the determined location of each identified quadrilateral.

27. The system of claim 21, the processor executing further application code instructions that are stored in the storage device and that cause the system to:

extract a user name from each of the identified quadrilaterals;

compare the user names extracted from each of the identified quadrilaterals; and assess the accuracy of the extracted names based at least in part on the comparison.

28. The system of claim 21, wherein the image of the one or more identified quadrilaterals is not cropped, and the optical character recognition algorithm is performed on each of the identified quadrilaterals.

29. The system of claim 21, the processor executing further application code instructions that are stored in the storage device and that cause the system to convert one or more of the card images to grayscale.

30. The system of claim 21, the processor executing further application code instructions that are stored in the storage device and that cause the system to:

store the aspect ratios of one or more card types in a database; and identify the expected aspect ratio of the card types in the cropped images based the database.

* * * * *